…

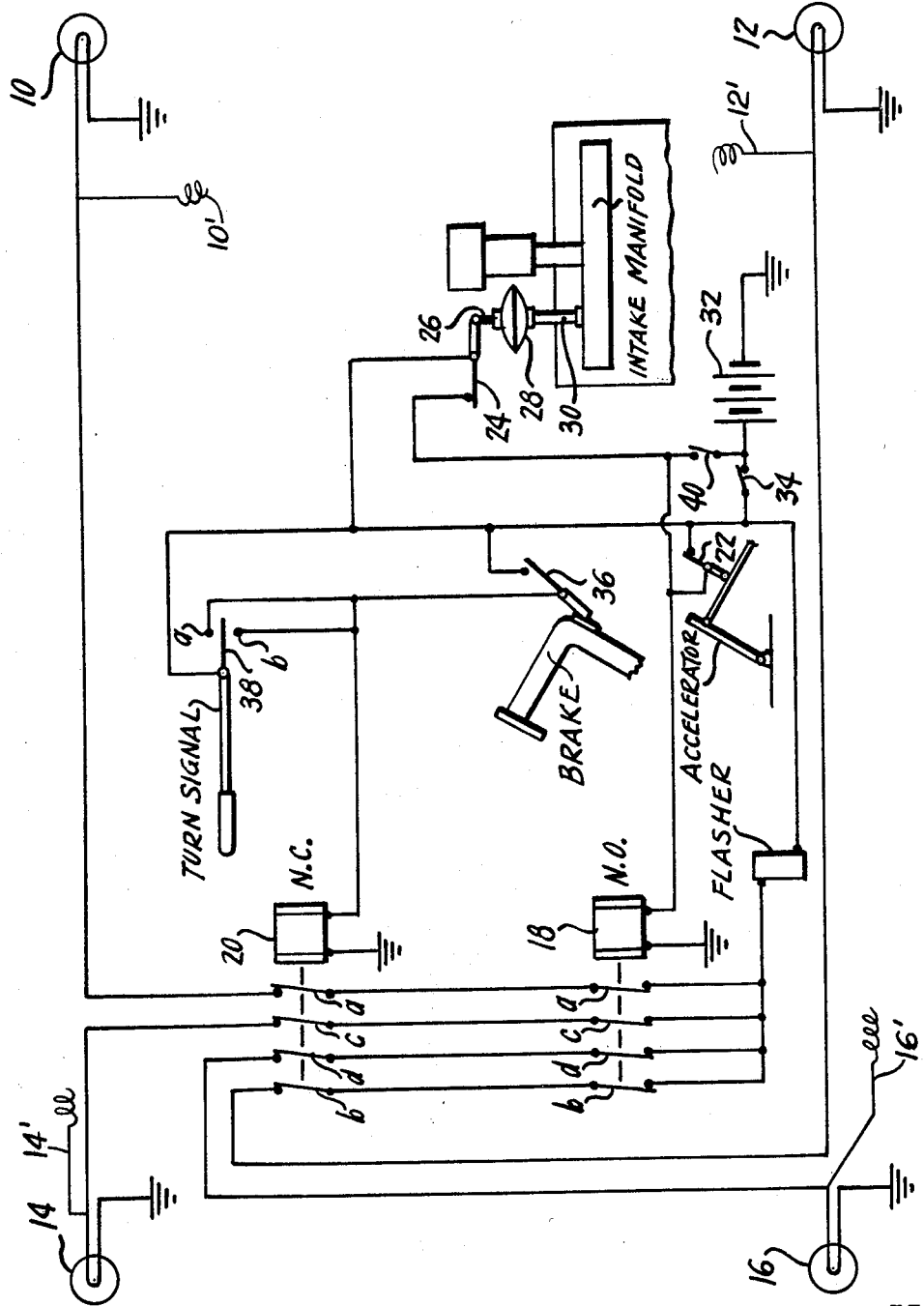

United States Patent Office 3,478,312
Patented Nov. 11, 1969

3,478,312
AUTOMOTIVE DECELERATION SIGNAL SYSTEM
Lloyd T. Lee, Holmen, Wis.
(818 S. 3rd St., La Crosse, Wis. 54601)
Filed Nov. 25, 1966, Ser. No. 596,868
Int. Cl. B60q 1/00, 1/26, 1/46
U.S. Cl. 340—67         10 Claims

ABSTRACT OF THE DISCLOSURE

An automobile safety light flasher system for flashing front and rear signal lamps to indicate that the automobile is decelerating and having means for overriding the flasher energizing circuit to permit operator selected signalling using the front and rear signal lamps.

BACKGROUND OF THE INVENTION

It is known in the prior art to provide flashing circuits for left and right signal lamps in the front and the rear of the vehicle for indicating when the vehicle is about to make a turn. It is further known in the art to provide means for flashing all four lamps to indicate an emergency condition. Devices are also known in the prior art in which a signal light is energized to indicate when an automobile is decelerating; however, such devices have not met with success because of the inconvenience of installation and the necessity of installing additional units. It is an object of this invention to provide a light flasher system which may be installed in any conventional automobile at the time of manufacture or may be installed subsequent to manufacture and which utilizes the left and right rear and front signal lamps for indicating when the automobile is decelerating.

A further object of this invention is to provide means for giving a flashing signal to other motorists and to pedestrians when the automobile is slowing down.

It is an additional object of the present invention to provide novel circuit means for energizing signal lamps and for overriding the energizing circuit when it is desired to give a selected signal.

The specific circuitry and interconnections of the drawing as described hereinafter comprise an object of the present invention. Other objects and purposes of the invention will become apparent from the specification and from the drawing to which reference is now made. The drawing is a schematic representation of the circuit of the present invention showing the interconnection to conventional parts of the automobile but omitting non-essential circuit elements of the conventional atuomobile lighting circuitry.

DESCRIPTION OF THE PREFERRED EMBODIMENT

The invention comprises left and right front signal lamps 10 and 12 and left and right rear signal lamps 14 and 16 which may be interconnected through wires 10′ 12′, 14′, and 16′ with turn signal flasher systems and brake light systems according to conventional practice. This latter interconnection is omitted from the drawing for purposes of clarity.

The invention further comprises a normally open multiple unit throw switch means 18, such as a multiple unit normally open relay which has switching unit or contacts a, b, c and d. A normally closed multiple unit throw switching means 20 which is also in the form of a relay having switching unit or contact sets, a, b, c and d is also provided. Front and rear lamps 10 through 16 are energized when the normally closed relay 20 is in its normal position and when relay 18 is actuated. Normally open relay 18 may be actuated to close the contact sets a, b, c and d through an accelerator actuator operated switch 22 or through a second switch 24 which is operated through linkage 26 by means of a vacuum operator which is connected by conduit 30 to the intake manifold of the automobile. When either switch 22 or switch 24 is closed, a circuit is completed from a source of electric energy such as battery 32 through the ignition switch 34, if desired, and through either switch 22 or 24 and through relay 18 to ground. When the actuator coil of relay 18 is energized, the contact units are closed, thereby completing a circuit from battery 32 through switch 34 and through a flasher unit and individually through contacts a, b, c and d of relay 18 and through the similar contacts of relay 20 to the signal lamps individually.

The signal lamps may be deenergized either by pressing the brake which closes switch 36 or by operating the turn signal which closes switch 38 either to contacts a or b, which are commonly connected with switch 36 and and which complete a circuit from the battery 32 through switch 34 and through the actuator coil of relay 20.

In practice, it is not necessary to have both an accelerator actuator operated switch 22 and a vacuum operated switch 24. Both switches are shown in the drawing as exemplary of the types of deceleration responsive means for actuating the normally open switching means to flashingly energize the signal lamps. In addition, while other driver operated control units than the turn signal and the brake may be connected into the system, switches 36 and 38 are exemplary of means responsive to such drive operated control units for actuating the normally closed switching means 20 to open the circuit means to deenergize the lamps. The circuit means shown in the drawing for completing individual circuits to the signal lamps from the electric energy source, when the normally open and the normally closed switching means are closed, and which include the individual switching units of the switching means and the flasher is also given as exemplary.

In operation, if only accelerator actuator responsive switch 22 were provided, when the automobile was being accelerated the accelerator actuator would be depressed and switch 22 would be closed. In this condition, relay 18 would be deenergized and the contacts thereon would be open. No signal would, therefore, be given by lamps 10 through 16. When the operator of the automobile releases the accelerator actuator for return to the rest position, as shown in the figures, switch 22 is closed thereby actuating the coil of relay 18 and closing the contacts of the relay. The circuit means thereby forms a complete path from battery 32 through the signal lamps and through the flasher to flashingly energize all the signal lamps to give an indication that the automobile is being decelerated. In order to give a proper brake signal, it is necessary to override the energizing circuit to permit energization of the rear signal lamps 14 and 16 to give the recognized brake signal. This overriding action is performed by the closure of switch 36 when the brake actuator is operated. Switch 36 closes a circuit to relay 20 which opens the individual circuits of the present system to the signal lamps. Other circuit means, not shown for clarity, are conventionally provided for energizing brake lamps 14 and 16.

Similarly, when it is desired to make either a left or a right hand turn while the automobile is decelerating, it is necessary to override the flashing energization of all the lamps in order to permit the conventional turn signals to be placed into operation. This overriding is effected through switch 38 which closes upon operation of the turn signal actuator and completes a circuit through the actuator coil of relay 20 to thereby actuate the relay and open the contacts thereon in the manner described. Circuit means are also provided in the conventional automobile, but not shown herein for purposes of clarity, for flashingly energizing only the left front and rear signal lamps to indicate a left hand turn and for flashingly energizing only the right front and rear signal lamps for indicating the right hand turn. Since such circuits are conventional they are omitted.

Alternatively, or in addition, a switch 24 which is operated through linkage 26 and is responsive to a predetermined vacuum level in the intake manifold may be provided. When the automobile is decelerated the vacuum in increased and switch 24 is closed, as shown in the figure. The closure of switch 24 flashingly energizes the signal lamps in the manner described with respect to switch 22 and the energization may be overriden in the manner previously described. It will be noted that the signal lamps are automatically energized when the vacuum in the manifold reaches a predetermined level by the closure of switch 24.

It will be noted that the present deceleration flasher system may also serve without modification as an emergency flasher system similar to those being installed at considerable extra cost in present automobiles. For example, should the automobile be disabled on the highway at any time, it is possible to give a flashing signal in the front and in the rear merely by leaving the ignition switch 34 in the closed position if the automobile is provided with the accelerator actuator operated switch 22. Alternatively, a manually operated switch 40 may be provided to perform this function.

I claim:

1. In an automobile lighting system having an electric energy source, left and right front signal lamps, and left and right rear signal lamps; a safety light flasher system comprising:
   normally open multiple unit switching means for energizing the signal lamps;
   normally closed multiple unit switching means for de-energizing the lamps;
   circuit means for completing individual circuits to the signal lamps from the electric energy source when the normally open and the normally closed switching means are closed, said circuit means including individual switching units of the normally open and the normally closed switching means and a flasher;
   means responsive to the deceleration of the automobile for actuating the normally open switching means to flashingly energize the signal lamps; and
   means responsive to a driver operated control unit for actuating the normally closed switching means to open the circuit means to deenergize the lamps for permitting a driver controlled signal to energize the lamps selectively.

2. The invention of claim 1 wherein:
   the driver operated control unit comprises a brake operated switch for actuating the normally closed switching means when the brake is operated.

3. The invention of claim 1 wherein:
   the driver operated control unit comprises a turn signal actuator operated switch for actuating the normally closed switching means when the turn signal actuator is operated.

4. The invention of claim 3 wherein:
   the driver operated control unit further comprises a brake operated switch for actuating the normally closed switching means when the brake is operated.

5. The invention of claim 4 wherein:
   the means responsive to deceleration of the automobile comprises an accelerator actuator operated switch for actuating the normally open switching means when the accelerator actuator is released for return to the rest position thereof.

6. The invention of claim 5 wherein the automobile further comprises an intake manifold, and wherein:
   the means responsive to deceleration further comprises a vacuum operator and a switch operated thereby for actuating the normally open switching means when the vacuum in the intake manifold of the automobile changes responsive to deceleration of the automobile.

7. The invention of claim 4 wherein the automobile further comprises an intake manifold, and wherein:
   the means responsive to deceleration comprises a vacuum operator and a switch operated thereby for actuating the normally open switching means when the vacuum in the intake manifold of the automobile changes responsive to deceleration of the automobile.

8. The invention of claim 1 wherein the automobile further comprises an intake manifold, and wherein:
   the means responsive to deceleration comprises a vacuum operator and a switch operated thereby for actuating the normally open switching means when the vacuum in the intake manifold of the automobile changes responsive to deceleration of the automobile.

9. The invention of claim 1 wherein:
   the means responsive to deceleration of the automobile comprises an accelerator actuator operated switch for actuating the normally open switching means when the accelerator actuator is released for return to the rest position thereof.

10. The invention of claim 1 wherein the automobile further comprises a vacuum intake manifold, and wherein:
    the normally open multiple unit switching means comprises a relay having multiple contact units and an actuator coil;
    the normally closed multiple unit switching means comprising a relay having multiple contact units and an actuator coil;
    the means responsive to the deceleration of the automobile comprises an accelerator operated switch and circuit means interconnecting said switch and the actuator coil of the normally open switching means, and further comprises a second switch, means responsive to the vacuum in the intake manifold for operating the second switch for automatically actuating the normally open switching means when the vacuum reaches a predetermined value and parallel circuit means interconnecting the second switch and the normally open switching means actuator coil; and
    the means responsive to a driver operated control unit comprises a switch operatively engaged by the brake actuator, a switch operatively engaged by the turn signal actuator and parallel circuit means interconnecting the normally closed switching means actuator coil, for deenergizing the lamps when either or both of said switches are closed.

References Cited

UNITED STATES PATENTS

| 2,282,761 | 5/1942 | Herwig | 340—55 |
| 3,213,417 | 10/1965 | Lewus | 340—67 |
| 3,320,586 | 5/1967 | Wagner | 340—66 |
| 3,395,388 | 7/1968 | Hendrickson | 340—71 |

JOHN W. CALDWELL, Primary Examiner

K. N. LEIRNER, Assistant Examiner

U.S. Cl. X.R.

340—81, 72